United States Patent Office 2,764,506
Patented Sept. 25, 1956

2,764,506

PROCESS FOR IMPREGNATING FIBROUS MATERIAL DERIVED FROM A TETRAFLUOROETHYLENE POLYMER AND PRODUCT

John Augustus Piccard, Swarthmore, Pa., assignor to E. I. du Pont de Nemours and Company, Wilmington, Del., a corporation of Delaware No Drawing. Application September 24, 1954, Serial No. 458,287

19 Claims. (Cl. 117—65)

This invention relates to the provision of new sealing materials. More particularly, it relates to the provision of new structures derived from polyfluorinated polymers, which structures are useful as gaskets, braided packings and similar sealing devices.

In industrial processes and in many machines, sealing materials are needed that are non-corrosive and heat-resistant. Polymers of tetrafluoroethylene possess such properties, but they are not readily adaptable to the preparation of sealing materials because their properties which make them desirable in such uses, such as insolubility, make the shaping of the polymers into articles very difficult. Recently, fibers having outstanding properties have been prepared, and since the use of films as sealing materials is limited to uses where high tensile and tear strengths are not essential, it is desired to prepare from the stronger fibers sealing materials to supply a long felt requirement.

Accordingly, an object of this invention is the preparation from fibers of tetrafluoroethylene polymers structures capable of being used as sealing materials. A further object is the provision of fibrous articles made from tetrafluoroethylene polymers, which articles are chemical- and heat-resistant and suitable as gasketing and similar materials. These and other objects will be apparent from the description that follows.

These objects are accomplished by impregnating fibrous structures, which, for example, may be woven, non-woven or braided articles, made from tetrafluoroethylene polymers with tetrafluoroethylene polymers in non-fibrous form with the resultant provision of structures containing fibrous and non-fibrous tetrafluoroethylene polymers in intimate, cooperative relationship. Neither the fibrous material nor the non-fibrous material by itself has the desired combination of dimensional stability and flow characteristics for sealing materials, but their combination in accordance with this invention does have. In order to produce the structures of this invention, polymers derived from at least about 85% of tetrafluoroethylene are converted into filaments which are generally oriented and converted into fibrous materials, such as braids or felts. Such conversions are described and/or claimed in such patents as U. S. Nos. 2,559,750 and 2,685,707 or in copending application Serial No. 436,014, filed June 11, 1954, among others. The fibrous material used can be made from continuous filament or staple and may be in the form of woven or non-woven fabrics, braiding, or felts, either needle-punched or not. Such a fibrous article is impregnated with a tetrafloroethylene polymer derived from at least about 85% of tetrafluoroethylene, usually by immersing the fibrous article in a colloidal dispersion of the polymer. The tetrafluoroethylene polymer dispersion surrounding the fibers is then broken and the excess paste and/or precipitated polymer, if any, is removed from the outside of the composite. The impregnation is carried out to produce composites in which about 5% to about 95% by weight is fibrous polymer and about 95% to about 5% by weight is polymer in non-fibrous form.

It is well known that the potential strength of high polymers as predicted from the strength of the carbon-to-carbon bond is always many times greater than the actual realized strength of the available polymer, because the individual molecules are randomly arranged and do not all bear their share of the load, but are stressed and fail a few at a time. An analogous effect may be postulated to explain the peculiarly desirable properties of the dried, non-fibrous, unfused tetrafluoroethylene polymer from a colloidal dispersion. The individual polymer particles from the dispersion are so small that they may weld to one another effectively on contact, and these bonding points in the porous mass of dried, unfused polymer are again randomly loaded so that the entire mass has a yield strength which is always far below the normal strength of the polymer. The micro-porous nature of this mass does not prevent effective sealing because the remaining pores after the material is compressed are only of molecular dimensions. Because of the very fine texture of the original mass and the very small size of the particles and pores which are generally too small to be resolved by an ordinary microscope, the tendency of the particles to weld to one another on contact enables the mass to consolidate and harden when compressed.

The articles produced thus are combinations of tetrafluoroethylene polymers in fibrous form and tetrafluoroethylene polymers in non-fibrous form. They are unfused and the agglomerated, non-fibrous form is made by breaking a dispersion of the polymer so that the coagulum becomes located in the interstices or about the fibers in the fibrous material. A close, cooperative contact is formed for the composite is capable of consolidation upon the application of pressure.

The following examples are given for illustrative purposes only and are not limitative; the parts and percentages therein are by weight.

*Example I*

Polytetrafluoroethylene filaments of 6–10 denier, drawn at room temperature to three times their original length were cut into 5 inch staple. This staple was blended with 3% by weight of 3 denier 2.5 inch viscose rayon staple for ease in processing, and was carded and cross-lapped into a web. The web was passed through a needle loom, alternating the punching. First, one side was punched, the web was then turned over and was punched, and this was done a total of five times on each side, making a total of ten passes through the loom. This loom was equipped with the etched needles described in Example I of U. S. application Serial No. 427,465, filed May 4, 1954. The needled product was a relatively soft batt weighing about 40 grams per square foot. The needle-punched, non-woven batt was saturated by immersion in a liquid aqueous colloidal dispersion of polytetrafluoroethylene contained in a tray at room temperature and, while still immersed, the air was removed from the batt by brief exposure to vacuum. The stable dispersion used was composed of, by weight, 60% polytetrafluoroethylene, 36% water and 4% of octyl phenyl polyglycol ether, the latter acting as a stabilizing agent for the polymer dispersion. While the punched batt was still immersed in the dispersion, the entire contents of the tray were frozen by surrounding with Dry Ice. The frozen material was then allowed to warm up to room temperature to thaw out, in order to break the dispersion. The surplus polytetrafluoroethylene paste from the dispersion was then removed from the batt by scraping on both sides. After the batt had been allowed to dry at room temperature, it was roasted in an oven at 200° C. for two hours to destroy the residue of the dispersion stabilizing agent. The dried batt contained about 12% by weight of polytetrafluoroethylene fibers and about 88% by weight of curd-like polytetrafluoroethylene from the dispersion.

For test purposes, the resulting impregnated batt was used as a gasket sheeting and was cut to fit specially prepared steel flanges. These flanges were prepared in pairs, one pair having in one flange a recessed portion of 2 mils depth, one pair having in one flange a recessed portion of 10 mils depth, and one pair having in one flange a recess portion of 50 mils depth. For comparison purposes, a ⅛ inch thick solid polytetrafluoroethylene sheeting was tested as a gasket in the same way as was the impregnated batt of this invention. It was found that with a pressure on the gasket area of 400 pounds per square inch, the impregnated batt would seal on flanges with irregularities as great as 10 mils. The solid sheet gasket would not seal any flange irregularity with a pressure less than 600 pounds per square inch and would not completely seal a 2 mil irregularity with a pressure less than 1,800 pounds per square inch, nor an irregularity of 10 mils with a pressure less than 2,800 pounds per square inch, nor an irregularity of 50 mils with a pressure less than 8,000 pounds per square inch. The impregnated batt gasket of this invention, on the other hand, sealed a 50 mil flange irregularity with a pressure of 2,000 pounds per square inch. When the compressive yield of these gasket materials was measured by compressing the gaskets between flanges with a dial indicator to show the motion of the flanges, it was found that the solid sheet gasket, when held for half an hour at 2,000 pounds per square inch, allowed 3.5 mils of creep and, when the pressure was then increased to 6,000 pounds per square inch, the gasket yielded an additional 8.1 mils during a half hour hold period. In view of its much lower sealing pressures, the impregnated batt gasket was tested likewise at 600 pounds per square inch and 2,000 pounds per square inch and yielded, respectively, 2.9 mils and 7 mils. It may thus be seen that the impregnated batt gasket of this invention would seal reasonable flange irregularities at about one-seventh of the pressure that was required with the solid sheet gasket of polytetrafluoroethylene, and yet showed less creep on being held at about one-third the pressure, and was as well able to accommodate extreme flange irregularities such as the 50 mil gap. It should be noted that in these tests, the two gaskets were of about the same initial thickness, but that due to its porosity, the impregnated batt gasket was the lighter and when under pressure, the thinner, and that if the two had been tested at the same weight per unit area, the ability of the impregnated batt gasket to accommodate major flange irregularities would have been proportionately greater.

*Example II*

A non-woven, needle-punched bat of polytetrafluoroethylene fibers was prepared as in Example I, except that the batt was passed through the needle loom a total of ten times on each side (alternating one pass at a time on each side of the batt), or a total of twenty passes. It was then further consolidated by heat shrinking it with infra-red heat at about 290° C., effecting about 25% linear shrinkage and resulting in a fairly firm felt about 1/16 of an inch thick. This felt weighed about 40 grams per square foot. The needle-punched felt was impregnated with the same aqueous dispersion of polytetrafluoroethylene as in Example I, and, after drying, contained about 20% by weight of polytetrafluoroethylene fibers and 80% by weight of curd-like polytetrafluoroethylene from dispersion. The impregnated felt was then cut to 2.5 inches outside diameter, 1.5 inch inside diameter gaskets to fit standard flange joints of 2 inch Corning Pyrex glass pipe. These gaskets were tested against water pressure in comparison with special molded gaskets of polytetrafluoroethylene. In this service, composition gaskets are commonly used where the chemical exposure is not too severe, but where polytetrafluoroethylene gaskets are required, the polymer in the form of solid sheeting usually does not seal, because it is too hard and the glass pipe cannot stand the pressure which would be necessary. The molded polytetrafluoroethylene gaskets have an annular, sharp edged ridge bearing against each glass surface so that they are able to seal when the flange bolts are tightened with a torque of from 60 to 80 inch pounds. In these tests, the impregnated felt gaskets sealed perfectly with a bolt torque of 40 inch pounds.

Similar results can be obtained using a copolymer of tetrafluoroethylene and trifluorochloroethylene (95/5) in both the fibrous and non-fibrous portions of the composite.

*Example III*

A non-woven, needle-punched batt of polytetrafluoroethylene fibers was prepared and impregnated with the polymer dispersion following the directions given in Example I. The impregnated needle-punched batt, after roasting, was cut to gasket shape and placed in service in 1.5 inch glass lined steel pipe with the usual type of flange couplings handling 98% sulfuric acid at 150° C. The usual procedure in this factory installation had been to use composite gaskets of asbestos sheet in an envelope of polytetrafluoroethylene. However, these composites rarely gave more than a few days' service because acid leakage on the outside of the pipe destroyed the exposed asbestos filler sheet. In this service, the impregnated batt gasket gave perfect performance with no unusual precautions and was still in service a month later.

Using a copolymer of tetrafluoroethylene and hexafluoropropylene (90/10) as the impregnant for the polytetrafluoroethylene fibrous materials leads to similar results.

*Example IV*

A cloth was woven from continuous filament polytetrafluoroethylene yarns (7 denier per filament) using a special multi-ply weave such as is commonly used for papermakers' drier felts. This weave was chosen because the individual yarn cross-overs represented only a fraction of the total thickness of the cloth. The cloth was thus tightly woven and very smooth and uniform for its thickness. It weighed about 8 pounds per square yard and was ⅛ inch thick. This cloth was immersed in the aqueous polymer dispersion of Example I and the air was removed by brief exposure to vacuum to complete the impregnation. While the cloth was still immersed in the dispersion, the whole was heated to the boiling point of the dispersion for several hours to break the dispersion inside the fabric. The fabric was then removed from the liquid, scraped clean of excess dispersion and left at room temperature to dry. The dried, impregnated cloth was composed of 67% fibrous polytetrafluoroethylene and 33% non-fibrous polytetrafluoroethylene. A gasket was cut from this cloth and tested as in Example II. The gasket sealed with a bolt torque of 60 inch pounds.

*Example V*

A centrifugal pump operating at 1,750 R. P. M. with a 1⅜ inch shaft was pumping fuming nitric acid (conc. 101–102%). The stuffing box designed for a ⅜ inch braided packing originally used blue Cape asbestos impregnated with mineral fat and graphite. This lasted only a few weeks before leakage occurred. Then, ⅜ inch lattice braid packing made of polytetrafluoroethylene continuous filament yarn (7 denier per filament) was placed in use in the above stuffing box. This packing overheated rapidly and was unsatisfactory. Then, a similar polytetrafluoroethylene lattice braid was impregnated with an aqueous colloidal dispersion of polytetrafluoroethylene containing 40% polymer solids, by passing the braid continuously under and over guide rolls in a tank of dispersion and wiping off the surplus dispersion before drying. After drying, the impregnated braided packing contained 20% of non-fibrous polymer from dispersion. This impregnated braided packing was still satisfactory and in service after 7 months in this application.

From the above examples, it can be seen that various fibrous materials can be used in the preparation of the composites. The filaments may be shaped into woven or non-woven forms such as fabrics; felts may be used and preferably these are needle-punched since stronger felts are obtained thereby and these stronger felts are much easier to impregnate. Braiding is applicable and the starting materials are not limited to fibers for the braiding may be made from ribbons or tape of the tetrafluoroethylene polymer, for such braiding has a fibrous quality somewhat resembling that of comparable articles prepared from true fibers. The fibrous materials used may be prepared from either staple or continuous filaments and the fibrous starting materials, for example the non-woven batts, may or may not have received a shrinkage treatment. The non-woven, needle-punched batts which have been subjected to a shrinkage treatment are particularly preferred, these being referred to as non-woven felts.

The braiding referred to above as another form of packing that is soft enough to shape around movable shafts (e. g., on motors) may be made by braiding a yarn of tetrafluoroethylene polymer filaments or monofils slit from a sheet or film of the tetrafluoroethylene polymer. However, the cut ends of the braided packing tend to fray during handling. This fraying may be reduced by heat setting the braided packing after braiding, preferably in the form of a helix, at a temperature of about 280° C. A desired further improvement in the coherence of the cut ends of the braided packing may also be achieved by this invention, that is, by impregnating the braid with, for example, an aqueous colloidal dispersion of polytetrafluoroethylene. With braiding, the amount of impregnation is usually held to a minimum, being about 5% to about 30%, as a certain amount of void space is essential to the proper functioning of this braided type of packing; in other words, these braided packings are not completely sealed by impregnation since they must be allowed to leak some to function serviceably.

The fluid dispersions used in impregnating the various fibrous materials should, of course, be capable of penetrating into the fibrous material. A ready test is filterability, for if the fibrous structure is so tight or the dispersion fluidity is so low that the dispersion cannot be filtered through the fibrous material, adjustment of either or of both factors will be in order. Generally, very little difficulty is encountered. The polymer solids content may be as low as about 30% and as high as about 75%, based on the total weight of the polymer dispersed and the liquid dispersing medium. Usually, it is desired in this invention to use as high a concentration of dispersed colloidal polymer particles as possible, the dispersion being, of course, stable enough to handle without breaking or coagulating the dispersion prior to the desired time. The dispersions preferably contain one or more of the many suitable dispersion stabilizing agents, such as those described in U. S. Patent No. 2,478,229. Since the 50% to 65% aqueous dispersions are readily available and applicable, these are preferred.

The polymer used in preparing the fibrous or the non-fibrous components may be any polymer derived from at least about 85% tetrafluoroethylene. The tetrafluoroethylene content may vary from about 85% to 100% by weight. Because of its superior heat and chemical resistance, the homopolymer, polytetrafluoroethylene, is preferred. The copolymers of tetrafluoroethylene containing up to about 15% by weight of the comonomer include copolymers of tetrafluoroethylene with one or more unsaturated organic compounds containing a terminal ethylenic double bond and being copolymerizable with tetrafluoroethylene, being exemplified by such monomers as ethylene, trifluorochloroethylene, difluorodichloroethylene, vinyl fluoride, hexafluoropropylene, vinylidene chloride and similar compounds. The specific polymers used in the fibrous and non-fibrous starting materials need not be identical. Generally, both are made from the homopolymer, polytetrafluoroethylene.

The polymer and copolymer colloidal dispersions or emulsions that may be used and their preparation are given in such patents as U. S. Patents Nos. 2,534,058, 2,559,752, 2,478,229 and 2,613,193 or in application Serial No. 281,915, filed April 11, 1952, abandoned and refiled December 22, 1954 as Serial No. 477,117. While the examples given above employ aqueous dispersions, it should be noted that non-aqueous dispersions can be used also. Suitable organosols, for example, are described in application Serial No. 389,160, filed October 29, 1953, now Patent 2,718,452. The aqueous dispersions can be modified so that the water, either a portion of it or the whole of it, is replaced by a compatible fluid, such as ethylene glycol, as described in application Serial No. 281,915 above. Such modification may have the advantage of making the processing easier.

The extent to which the fibrous base structure is impregnated will depend to some extent on the use planned for the sealing material to be produced. For example, if the sealing material is to be used with a relatively slow moving or stationary device such as a valve stem or flange, a fairly heavy impregnation is normally used. In these uses, flat fibrous structures such as non-woven batts and felts and woven cloths are employed wherein about 40% to about 95% by weight of the composite is non-fibrous tetrafluoroethylene polymer and about 5% to about 60% is fibrous, with about 10% to about 20% of fibrous material being preferred. In sealing fast moving devices such as a pump shaft, it is desired to employ lower loadings of polymer from the dispersions. For such uses, braided fibrous structures are most suitable wherein about 5% to about 30% of the polymer is non-fibrous and about 70% to about 95% is fibrous polymer. Of the total weight of the composite, there may be an appreciable amount of one or more inert fillers, such as silicon carbide, aluminum oxide, graphite, zirconium oxide and the like. These fillers may be incorporated by any convenient method, such as by mixing or dispersing them in the dispersions of the tetrafluoroethylene polymer to be used in the impregnation step. Generally, such fillers are used in amounts of 30% or less and their presence or absence will depend in part on the ultimate use of the sealing material.

In setting the dispersed solids about the multitude of fibers in the fibrous structure, a number of techniques can be employed. The liquid material, water or organic compound, may be removed by simply allowing it to evaporate, by the use of reduced pressure, or by heating to effect evaporation. The impregnated fibrous structure may be frozen and then warmed, for, upon warming, the solid particles formerly in dispersion are not redispersed. Alternatively, the impregnated fibrous structure may be heated to a temperature above that at which the dispersion is stable. The dispersion may also be broken about the fibrous structure by the addition of electrolytes or coagulating agents (e. g., acetone) which will precipitate the polymer from the dispersed state. Generally, the composite is heated after the setting or breaking of the dispersion in order to free it of any excess liquid such as water and in order to decompose or remove dispersing agents. The temperatures used in this heating step must be below the fusion point of the lowest fusing tetrafluoroethylene polymer present in the composite, for fusion of either the fibrous or the non-fibrous components is to be avoided. The polymers used in this invention have very high fusion points, being 300° C. or above, and normally temperatures of 200° C. or below are sufficient in carrying out the drying or decomposing steps. The impregnated fibrous material may be dried at any suitable temperature below the boiling point of the liquid present. Although the impregnated, dried fibrous material may be employed as such, as a gasket or packing, it is preferred to heat treat or roast the dried, impregnated structure at an elevated temperature sufficient to decompose or remove any undesirable stabilizing agents or other additives which may be retained in the impregnated structure from the dispersion. The temperature should not be high enough to produce undesirable effects on the fibrous component. A suitable roasting cycle for the dispersions used in the examples is 200° C. for about two hours, but the time and temperature of roasting will depend upon the specific stabilizers which are to be removed. It may sometimes be desirable to employ an additional step between the drying and roasting of the impregnated structure. This step involves smearing or doctoring a thin coating of a tetrafluoroethylene polymer paste, which has been previously prepared by breaking an aqueous dispersion of the polymer, on the surface of the dried structure in order to improve the surface uniformity and appearance. The sealing materials of this invention are not fused because fusion detracts from the flowability desired. In fact, in the drying step, it is desired to avoid disturbing the microporous or curd-like nature of the deposited polymer, which disturbance would occur in boiling off the contained liquids from the impregnating step. In other words, the products of this invention possess a structure in which the tetrafluoroethylene polymer retains its fibrous character and these individual fibers are surrounded by a microporous matrix of unfused tetrafluoroethylene polymer. In addition to the heat treatment which serves to eliminate such tackiness as is caused by dispersing or stabilizing agents, it may also be desirable to burnish mechanically the surface of the impregnated structure to promote clean handling. It may even be desired to shrink the articles prior to their use.

The sealing materials provided hereby are insoluble in all known volatile solvents; they are stable at high temperatures; they are abrasion resistant; and they have unusual electrical properties, e. g., high dielectric strength, high insulation resistance and extremely low power factor. They present surfaces which are not sticky but are advantageously waxy in character. The movability of the fibrous and non-fibrous components, separately and relative to each other, makes for excellent sealing under low, medium or high pressure applications and their resistance makes them especially useful in these applications which involve highly active chemical environments. Low pressure sealing is valuable when fragile material such as glass or glass-lined steel is involved. Further, their flowability results in a uniformly increasing compactness with increasing pressure so that sealing of all depressions can be attained with a minimum pressure. Solid fused sheets of tetrafluoroethylene polymer do not behave in this manner, but conform only by passing sharply defined yield points and flowing somewhat unpredictably.

Any departure from the above description which is within the principles of this invention is intended to be included within the claims below.

I claim:

1. An article comprising from about 5% to 95% of a a tetrafluoroethylene polymer in fibrous form impregnated with from about 95% to 5% of a tetrafluoroethylene polymer in non-fibrous, coagulated form based on the combined weights of the fibrous and non-fibrous forms.

2. The article of claim 1 in which the polymer in fibrous form is polytetrafluoroethylene.

3. The article of claim 1 in which the polymer in non-fibrous form is polytetrafluoroethylene.

4. The article of claim 1 in which the polymer in fibrous form and the polymer in non-fibrous form are derived from polytetrafluoroethylene.

5. The article of claim 1 wherein the said fibrous material is in the form of a non-woven fabric and is present between about 5% and 60% based on the weight of the combined fibrous and non-fibrous forms.

6. The article of claim 1 wherein the fibrous material is in the form of a non-woven, needle-punched batt.

7. The article of claim 1 in which the fibrous material is in the form of braided material and contains from 5% to 30% of non-fibrous polymer and from 70% to 95% fibrous polymer based on the weight of the combined fibrous and non-fibrous forms.

8. A non-woven, needle-punched batt of filaments derived from a tetrafluoroethylene polymer containing at least about 85% tetrafluoroethylene in the polymer molecule impregnated with a non-fibrous, coagulated tetrafluoroethylene polymer derived from at least about 85% tetrafluoroethylene, said fibrous polymer being present in amounts of about 5% to about 60% of the combined weights of the said fibrous and non-fibrous polymer and the said non-fibrous polymer being present in amounts of about 40% to about 95% of the combined weights of the said fibrous and non-fibrous polymer.

9. An article comprising from about 5% to 95% of a tetrafluoroethylene polymer in fibrous form impregnated with from about 95% to 5% of a tetrafluoroethylene polymer in non-fibrous form, said non-fibrous form based on the combined weight of the fibrous and non-fibrous forms being microporous, being in close, cooperative contact with said fibrous form and being capable of consolidation upon application of pressure on said article.

10. A process for the preparation of sealing materials which comprises impregnating fibrous material derived from a tetrafluoroethylene polymer derived from at least about 85% by weight of tetrafluoroethylene with a dispersion of a tetrafluoroethylene polymer derived from at least about 85% by weight of tetrafluoroethylene and breaking the dispersion to form a coagulum of said polymer from the said dispersion, in close relationship to the fibers in said fibrous material, forming thereby said sealing materials.

11. The process of claim 10 in which the said fibrous material is in the form of a non-woven fabric.

12. The process of claim 10 in which the fibrous material is in the form of a non-woven, needle-punched fabric.

13. The process of claim 10 in which the polymer content in said dispersion is about 30% to about 75% based on the combined weights of polymer and liquid dispersing media present.

14. The process of claim 10 in which the said dispersion is an aqueous dispersion.

15. The process of claim 10 in which the resultant impregnated fibrous materials are frozen and then are allowed to warm up, producing thereby the said coagulum.

16. The process of claim 10 in which the said polymer in fibrous form is polytetrafluoroethylene.

17. The process of claim 10 in which the said polymer in dispersion is polytetrafluoroethylene.

18. The process of claim 10 in which the polymer in fibrous form and the polymer in the dispersion are derived from polytetrafluoroethylene.

19. The process for the preparation of sealing materials which comprises impregnating fibrous material made of a tetrafluoroethylene polymer derived from at least about 85% by weight of tetrafluoroethylene with a dispersion of a tetrafluoroethylene polymer derived from at least about 85% by weight of tetrafluoroethylene; and breaking the dispersion to form a non-fibrous, microporous coagulum from the dispersed polymer which coagulum is in the spacings between and is about the fibers in said fibrous materials, forming thereby said sealing materials.

References Cited in the file of this patent

UNITED STATES PATENTS

| | | |
|---|---|---|
| 2,059,121 | McDermott | Oct. 27, 1936 |
| 2,478,229 | Berry | Aug. 9, 1949 |
| 2,534,058 | Renfrew | Dec. 12, 1950 |
| 2,574,849 | Talalay | Nov. 13, 1951 |

OTHER REFERENCES

Du Pont "Teflon" pamphlet, Jan. 15, 1951, page 9.